US008021638B2

(12) United States Patent
Matviya

(10) Patent No.: US 8,021,638 B2
(45) Date of Patent: Sep. 20, 2011

(54) CARBON FOAM AND HIGH DENSITY CARBON FOAM COMPOSITE TOOLING

(75) Inventor: Thomas M. Matviya, McKees Rocks, PA (US)

(73) Assignee: Touchstone Research Laboratory, Ltd, Triadelphia, WV (US)

( * ) Notice: Subject to any disclaimer, the term of this patent is extended or adjusted under 35 U.S.C. 154(b) by 1061 days.

(21) Appl. No.: 11/751,668

(22) Filed: May 22, 2007

(65) Prior Publication Data

US 2010/0266813 A1 Oct. 21, 2010

Related U.S. Application Data

(63) Continuation-in-part of application No. 11/619,223, filed on Jan. 3, 2007, now Pat. No. 7,628,973, which is a continuation-in-part of application No. 11/393,308, filed on Mar. 30, 2006.

(60) Provisional application No. 60/594,355, filed on Mar. 31, 2005.

(51) Int. Cl.

| | |
|---|---|
| ***C01B 31/00*** | (2006.01) |
| ***C01B 31/02*** | (2006.01) |
| ***C01B 31/04*** | (2006.01) |
| ***B28B 5/00*** | (2006.01) |
| ***B29C 63/00*** | (2006.01) |
| ***B29C 65/00*** | (2006.01) |
| ***B29C 45/14*** | (2006.01) |

(52) U.S. Cl. .................... 423/445 R; 423/448; 264/241; 264/259

(58) Field of Classification Search .............. 423/445 R, 423/448, 414, 439, 460; 264/29.1, 29.6, 264/29.7, 241, 259; 106/38.2, 38.22, 38.27, 106/38.28, 38.9; 428/613, 36.5, 158
See application file for complete search history.

(56) References Cited

U.S. PATENT DOCUMENTS 5,709,893 A * 1/1998 McCarville et al. .......... 425/389
6,749,652 B1 * 6/2004 Rogers ............................ 44/607
6,776,936 B2 * 8/2004 Hardcastle et al. .......... 264/29.1
2005/0003195 A1 * 1/2005 Joseph et al. ................. 428/408
2006/0083673 A1 * 4/2006 Morgan et al. ............ 423/445 R

* cited by examiner

*Primary Examiner* — Jerry Lorengo
*Assistant Examiner* — Noah S Wiese
(74) *Attorney, Agent, or Firm* — Philip D. Lane

(57) ABSTRACT

Tools for the forming of composite parts from composite forming materials, having tool bodies that comprise, at least in part, carbon foam and high density carbon foam are described. In some embodiments, a surface of the carbon foam or high density carbon foam may comprise a tool face. In other embodiments, the carbon foam or high density carbon foam may support an other material, referred to as tool face material, wherein a surface of the tool face material may comprise a tool face. The tools of the present invention may be lighter, more durable, and less costly to produce and/or use than conventional tools used for the production of composite parts, particularly those tools used for the production of carbon composites. Additionally, such tools may be reusable, repairable, and more readily modifiable.

40 Claims, 9 Drawing Sheets

CARBON FOAM AND HIGH DENSITY CARBON FOAM COMPOSITE TOOLING

CROSS-REFERENCE TO RELATED APPLICATIONS

This application is a continuation-in-part of U.S. patent application Ser. No. 11/619,223, filed Jan. 3, 2007 entitled "Simultaneous Production of High Density Carbon Foam Sections" which is a continuation-in-part of U.S. patent application Ser. No. 11/393,308, filed Mar. 30, 2006 entitled "High Density Carbon Foam", which is based on U.S. Provisional Patent Application No. 60/594,355, filed on Mar. 31, 2005, and which all above referenced applications are herein specifically incorporated by reference in their entireties.

FIELD OF THE INVENTION

This invention relates to composite tooling and methods for using the same, more specifically incorporating carbon foam and high density carbon foam in a tool body for forming parts made from composite materials.

BRIEF BACKGROUND OF THE INVENTION

Generally, composite materials are prepared by imbedding a reinforcing material within a matrix material. Composite materials having high degrees of utility typically exhibit mechanical or other properties superior to those of the individual materials from which the composite was formed. A common example of a composite material is fiberglass. Fiberglass is glass fibers, which are the reinforcing material, embedded in a cured resin, which constitutes the matrix material.

Composite materials have been found to have a high degree of utility when used as parts of structures, components, sub assemblies, and the like, of assemblages such as aircraft, missiles, boats, medical equipment, and sporting goods. A composite commonly used in such applications is fiberglass. Other composites having particularly high degrees of utility in such applications are those that are prepared from carbon fibers combined with a matrix material such as thermoset (e.g. thermosetting and the like) and/or thermoplastic resins. Such composites are referred to as carbon fiber composites (herein after referred to as CFC), or more commonly, carbon composites. Carbon composites have been used, for example, as aircraft flight surfaces, missile bodies, orthopedic supports, and golf club shafts. The utility of such carbon composites is typically related to their exceptionally high strength to weight ratio and their fatigue and corrosion resistance. In most instances, these beneficial properties exceed those of the metals or other materials supplanted by the use of the carbon composites. Additionally, some types of carbon fiber composites can be carbonized to form carbon-carbon composites.

Specific fiber orientations may be desired in the final composite product to impart accentuated strength, stiffness, and/or flexibility along certain axes. Furthermore, composite forming materials, particularly carbon fiber, are relatively expensive and wastage is generally discouraged. For these and other reasons, composites are produced in sizes, shapes, and forms that closely match those required by the intended application. In fact, composites, particularly carbon fiber composites used in aerospace and many other applications, are routinely produced, within very restrictive tolerances, to the required size.

The forming of composites, including carbon composites, to such high dimensional requirements is typically accomplished by the use of mold like devices commonly referred to as tools. These tools encompass one or more surfaces, referred to as tool faces, upon which the composite is formed, shaped, molded, or otherwise produced into components of predetermined sizes and shapes. Such components can include structures, parts, sub assemblies and the like, and may be referred to collectively as parts. The tool face is a surface typically formed such that it is a precise three dimensional negative mirror image of a surface of the desired composite component. That is, a raised surface on the composite part will be matched and formed by an equivalently (negatively) dimensioned surface depression of the tool face. Likewise, a recessed surface on the composite part will be matched and formed by an equivalently (negatively) dimensioned raised surface of the tool face. In practice, a mixture of a reinforcing material and a matrix material, for example carbon fiber and a resin, are placed upon the tool face by any number of procedures and brought into intimate contact with that tool face. The dimensions of the tool face are such that this contact effectively molds a surface of the matrix material and reinforcing material mixture into the desired shape and dimensions. The matrix material is then solidified, typically by curing of the resin, to produce the composite component. For example, a carbon fiber containing resin is cured, typically by the application of heat, to yield a solid CFC component having a surface exhibiting the shape and dimensions imparted by the tool face.

In addition to the tool face, a tool is also comprised of a tool body and sometimes a support structure. The tool body comprises the tool face. That is, the tool face upon which the composite, for example a CFC, is formed is a surface of the tool body. The tool body may also encompass a cover which minimally encloses the tool face, or a portion thereof, such that an essentially closed volume is formed between the tool face and the cover. The support structure may be connected to the tool body and may serve a number of purposes, including but not limited to, support, orientation, and transportation of the tool body and face along with protection of the tool body and face from damage.

Important characteristics of tooling include, for example, quality, dimensional accuracy, weight, strength, size, cost, ease of repair, and the like. Additionally, rigidity and durability are considered to be very important characteristics of tooling. All of these characteristics are dependent on the tool design, the materials of construction of the tool, and on the materials used to form the composite.

A characteristic of the tooling that may be very important is the coefficient of thermal expansion (herein after referred to as CTE and CTEs in the plural form) exhibited by the tool face. As the tool face is a surface of the tool body, the CTE exhibited by the tool face is dependent on the material of which the tool body is comprised. It is generally desired that the tool face exhibit a CTE that is substantially similar or equivalent to the CTE of the formed composite component (which may also be referred to as a composite part, or more simply part) formed thereon. Preferably, the CTE exhibited by the tool face should be substantially similar or equivalent to the CTE of the formed composite part over a wide temperature range. The importance of having a substantial similarity, or more preferably equivalence, between the CTE of the composite part and that exhibited by the tool face is related to the manner in which composite parts are prepared using tools. That is, typically, the materials used to form the composite are placed on the tool face at room temperature. The temperature of the tool and composite forming materials is then increased to some elevated temperature, typically such as 250° F. or more, to cure the resin of the composite material.

Once the resin is cured, the resulting composite part, for example a CFC, is rigid. Following resin curing, the tool face and composite part are cooled to room temperatures. Such exposure to temperatures significantly above room temperature is the reason it is desired that the CTE of the tooling match that of the resulting composite part. For example, if the CTE of the composite part is significantly less than that exhibited by the tool face, the composite part may be trapped or retained on the tool by the relatively greater contraction of the tool face dimensions with cooling. Conversely, if the CTE of the composite part is significantly greater than that exhibited by the tool face, the part may again be retained on the tool or may damage the tool face during contraction, or cured composite dimensions may differ from those of the tool face.

Typically, carbon composites have relatively low CTEs while the CTEs for most other materials are much higher. Therefore it is very difficult to match the CTE exhibited by the tool face with the CTE of a carbon composite as there are few materials available for construction of the tool body that have sufficiently low CTEs. Such available low CTE materials suitable for construction of the tool body include, for example, graphite, other carbon composites, INVAR® (e.g., a controlled expansion nickel iron alloy), and the like.

INVAR® is durable and has a CTE that is substantially similar to that of carbon composites. However, INVAR® based tools are typically heavy, difficult to fabricate, and can require, for example, as many as seventeen separate stages to fabricate. Such numerous fabrication stages can lead to about a 140% to about a 250% increase in tooling costs and a four fold increase in lead times, as discussed in "Fabrication and Analysis of Invar Faced Composites for Tooling Applications", Proceedings of Tooling Composites 93, Pasadena, Calif., which is hereby incorporated by reference in its entirety.

As with INVAR® based tooling, graphite based tooling may be capable of matching the CTE of CFC parts, and the like, even for example, the difficult to match CTE of low CTE materials. However, such tooling typically utilizes relatively large blocks of graphite. Graphite is a relatively dense material. Therefore, such tooling may be relatively massive and possibly expensive. Additionally, such large, dense, massive, blocks of graphite may exhibit relatively high heat capacities and/or require extended time periods to heat and cool uniformly.

Similar to INVAR® based tooling, carbon fiber composite based tooling may be capable of matching the CTE of CFC parts, and the like, even for example, the difficult to match CTE of low CTE materials. For this type of tooling, carbon fiber composites are used as the total tool body and/or that portion of the tool body defining the tool face. Carbon fiber composite based tooling is advantageous as such CFC based tools are less expensive, lighter, have low thermal mass, and require shorter lead times for tool manufacturing than does conventional tooling such as that based upon INVAR®. However, CFC based tools are usually susceptible to damage if not handled with care, especially when composite is laid thereon. Additionally, surface degradation of CFC based tools may occur as a result of the repetition of the process cycle due to a combination of component adhesion, CTE mismatch, and oxidative decomposition. Furthermore, any necessary repairs of CFC based tools leads to an increase in repair and maintenance costs. Also, CFC based tools are subject to dimensional stresses from uneven support. Such stresses may cause a loss of rigidity. Accordingly, due to the aforementioned problems, CFC based tooling is not commonly used.

There are other important characteristics of composite tooling, particularly tooling for the production of CFC, which should also be considered. For example, in addition to being rigid, durable, strong, and CTE matchable, the tooling should also be low cost and easy to produce. That is, a factor usually considered when selecting material for a tool body is the total number of parts to be produced. Included in this consideration is the fact that production of large numbers of parts can more easily justify expensive tooling. Overall, however, it is generally accepted that rigid, strong, durable, and CTE matchable tooling, which can be easily produced at low cost, irrespective of the planned number of parts, is desired.

BRIEF SUMMARY OF THE INVENTION

Embodiments of the invention may include a tool for the production of at least one composite part, where the tool comprises a tool body having a tool face where the tool body is comprised of at least one piece of carbon foam and at least one piece of high density carbon foam, and where the tool face defines a surface that is a three dimensional negative mirror image of a surface of the at least one composite part. In some embodiments, a surface of the tool body defines a tool face, where a portion of the tool face is at least partially a surface of the carbon foam comprising the tool body. In other embodiments, a surface of said tool body defines a tool face, where a portion of the tool face is at least partially a surface of the high density carbon foam comprising the tool body.

Embodiments of the invention may also include various methods for producing at least one composite part. Some embodiments of the method may comprise the steps of providing a tool body having a tool face, where the tool body is comprised of carbon foam and high density carbon foam adhered together, and where the tool face defines a surface that is a three dimensional negative mirror image of a surface of the at least one composite part; placing composite forming material on the tool face; and curing the composite forming material thereby producing the composite part. Further, embodiments of the invention may also include composite parts formed by the various methods for producing at lest one composite part.

DETAILED DESCRIPTION OF THE INVENTION

Figure 1:
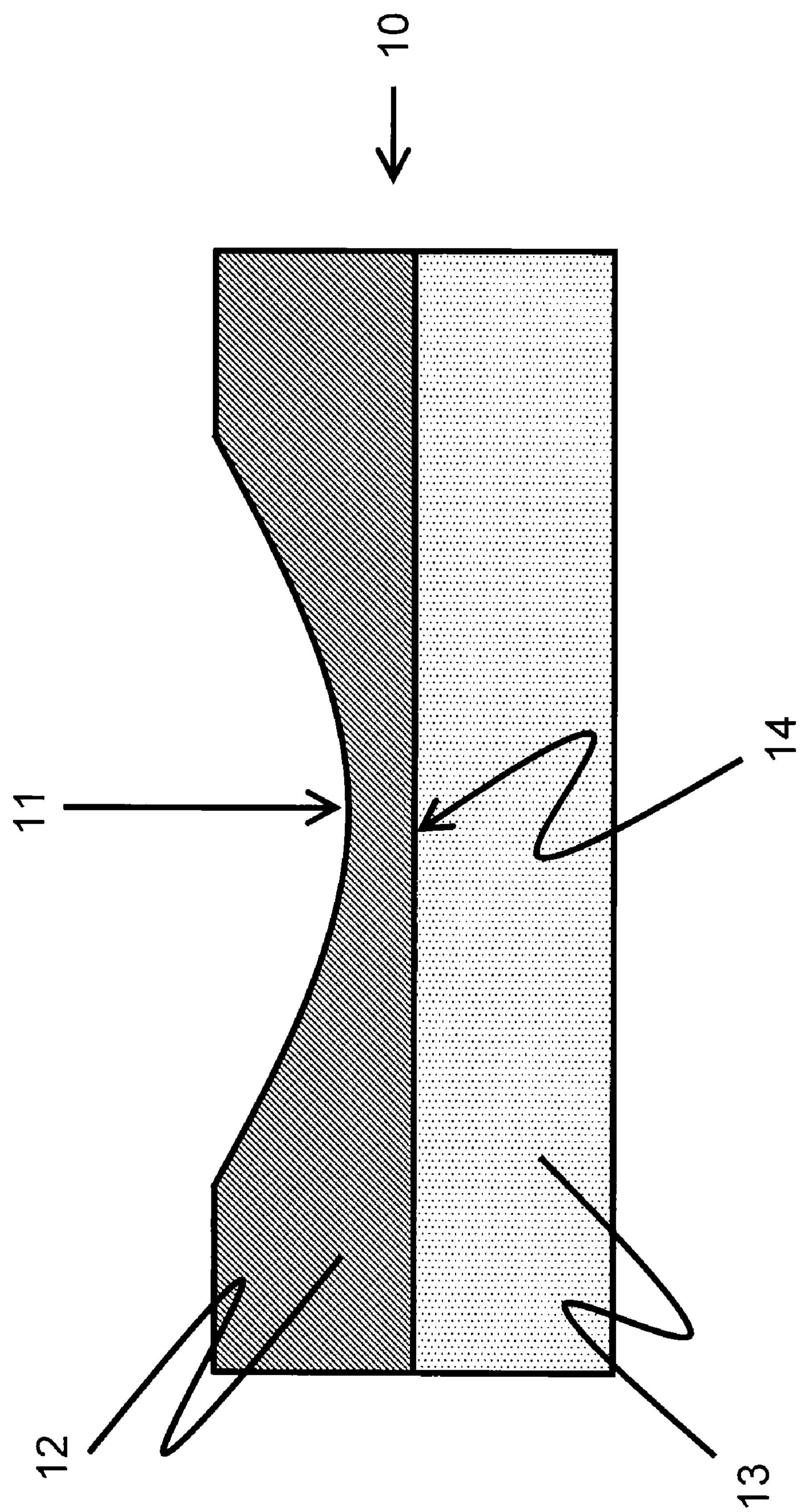
FIG. 1 illustrates a cross-sectional representation of a reusable tool having a tool body comprising carbon foam and high density carbon foam. Composite forming materials may be placed on the tool face of this tool for the purpose of forming a composite part.

The tools of the present invention have tool bodies that are comprised at least in part of carbon foam and high density carbon foam. As used herein, high density carbon foam may be referred to as HDCF in the singular or plural tense.

Tooling may be used to fabricate parts, including composite parts, of various types, shapes, sizes and materials with a high dimensional accuracy. The design of the tooling may be dependent on the desired shape of the part to be formed, the materials used to form the part, the amount of strength and rigidity which the tooling must have to support the materials necessary for forming the part, and/or the method used to provide the materials for forming the part.

Tools encompass one or more surfaces, referred to as tool faces, upon which composite forming material is formed, shaped, molded, or otherwise produced into a part(s) having a surface(s) of predetermined size and shape. Such parts can include, but are not limited to, structures, sub assemblies, components, portions of components, partial components, and the like, including any solid form having a shaped surface. The tool face is a surface of the tool body, typically formed such that it is a precise three dimensional negative mirror image of a desired surface of a part. That is, a raised surface on the part, for example a composite part, will be matched and formed by an equivalently (negatively) dimensioned surface depression of the tool face. Likewise, a recessed surface on the part will be matched and formed by an equivalently (negatively) dimensioned raised surface of the tool face.

In practice, materials comprising a composite part may be placed upon a tool face by any of a number of procedures. Commonly, composites utilize a resin(s) as the matrix material and fiber as the reinforcing material. But, a resin(s) and a particulate(s) may also be used as the matrix and reinforcing material, respectively. Sometimes fiber placement is closely controlled such that the resulting composite part exhibits a specific fiber spacing and/or orientation. The fiber and resin may be mixed or otherwise combined prior to placement of the tool face. Alternatively, the fiber may be placed on the tool face and the resin subsequently infused into the fiber by any of a number of procedures. In some instances, prior to the placement of materials which will comprise the composite, the tool face may be covered with a thin sheet of material, sometimes referred to as a parting sheet or release film, which forms closely to the tool face. Such sheets may be considered to be a temporary coating on the tool face. The surface of this sheet that is not in contact with the tool face, that is, the outside surface of the sheet, then effectively becomes the tool face. Such sheets may be used to protect the tool face and/or to provide for easier removal or release of the formed composite part. Alternatively, the materials comprising the composite may be prevented from bonding to the tool face by coating the tool face with a release agent. Release agents can include various polymers, including PVA, and waxes, among other materials. Release films may be composed of any of a number of polymeric materials that do not bond with any of the materials comprising the composite. Many types of release agents and films are known in the associated arts and may be used with the present invention.

The dimensions of the tool face may be such that a surface of the materials comprising the composite part, commonly a fiber containing resin, is effectively molded into the desired shape and dimensions. The resin(s) included in the materials comprising the composite part may be subsequently cured, in some instances by the application of heat, to yield a solid composite part having a surface of the shape and dimensions imparted by the tool face. It is not uncommon for such heat to be applied in an oven or autoclave. Use of an autoclave also may provide for the forming of composite parts at elevated pressures. The solid composite part so produced may then be removed from the tool face, subjected to any final shaping or other modification, and used for its designed utility.

In addition to the tool face, a tool is comprised of a tool body and in some embodiments a support structure. The tool body defines the tool face. That is, the tool face upon which the composite part is formed is a surface of the tool body. The support structure, if present, is connected to the tool body and may serve a number of purposes, including but not limited to, support, orientation, and transportation of the tool body and face along with protection of the tool body and face from damage.

The tools of the present invention have tool bodies that are comprised at least in part of carbon foam and HDCF. The tool bodies may be completely or partially comprised of carbon foam and HDCF. The carbon foam of individual tool bodies may be comprised of one or more individual pieces of carbon foam. Likewise, the HDCF of individual tool bodies may be comprised of one or more single pieces of HDCF.

If a tool body is comprised of two or more individual pieces of carbon foam, at least two pieces of the carbon foam may be at least partially bonded together. If a tool body is comprised of two or more individual pieces of HDCF, at least two pieces of the HDCF may be at least partially bonded together. Additionally, one or more pieces of carbon foam and one or more pieces of HDCF comprising the tool body may be at least partially bonded together. Such bonding together of the one or more pieces of carbon foam and the one or more pieces of HDCF may provide a volume of material that may provide at least a portion of a tool body. Adhesives, resins, cements, and the like may be used to bond or otherwise join the pieces. Mechanical methods, including, but not limited to, bolting, screwing, strapping, pinning, and the like, may also be used to bond, or otherwise join, two or more pieces of carbon foam and/or HDCF comprising the tool body. If partially comprised of carbon foam and HDCF, the tool bodies may be constructed such that the CTE of the tool face is substantially similar or equivalent to that of the carbon foam, HDCF, and the composite(s), particularly carbon fiber composite(s), parts prepared thereon. If the tool body is essentially comprised only of carbon foam and HDCF, the carbon foam and HDCF may have a CTE substantially similar or essentially identical to that of a composite, particularly a carbon fiber composite, and parts formed thereon.

The tool body may be comprised of other materials in those embodiments wherein the tool body is partially comprised of carbon foam and HDCF. In those embodiments, such other materials may, for example, coat or cover a surface of a tool body, occupy and/or define an internal and/or external volume of a tool body, impregnate elements comprising a tool body, and/or bond elements comprising the tool body together. In further embodiments, a surface of such other material may at least partially define a tool face. In those embodiments, such other material may be referred to as a tool face material. In some of those embodiments, the tool face material may be supported by carbon foam and/or HDCF comprising the tool body.

In some embodiments, the carbon foam of the tool body may at least partially support the HDCF of the tool body. In further embodiments, the HDCF of the tool body may at least partially support the carbon foam of the tool body. In some other embodiments, a surface of the carbon foam and/or HDCF comprising the tool body may serve to define at least a portion of a tool face. In still other embodiments, the carbon foam and/or HDCF may serve to support other materials, having a surface which defines at least a portion of a tool face (i.e. tool face materials).

By defining at least a portion of the tool face, a surface of the carbon foam, HDCF, and/or other materials has a surface geometry or configuration sufficient to impart the desired configuration to a surface of the composite part formed thereon. One or more surfaces of the carbon foam, HDCF, and/or other materials incorporated into a tool body may be fabricated into various predetermined geometries to provide for one or more tool faces reflecting those geometries. These geometries are then incorporated into a surface(s) of the composite part formed with the tooling. The tool face(s) defines at least a portion of one surface of at least one composite part formed with the tooling. A single tool may have a plurality of individual tool faces located on the surface(s) of the tool body. Other materials comprising the tool body, which may be tool face materials, may have CTEs substantially similar or essentially identical to that of the carbon foam, the HDCF, and to that of the composite part, particularly a carbon composite part, prepared thereon. In some embodiments, tool face materials for the production of CFC parts may be carbon composites. The tool face materials may be utilized in an amount or form such that the observed CTE of the tool face is substantially similar or essentially equivalent to that of the carbon foam, HDCF, and the composite part, particularly a carbon composite part, prepared thereon.

In an embodiment of the invention, the carbon foam of the tool body, the HDCF of the tool body, other materials of the tool body, and the tool face portion of the tool body, including any tool face materials, may be selected or utilized such that they exhibit CTEs substantially similar to, or essentially equivalent, to each other and to the CTE of the resultant composite part formed on the tool face. In a further embodiment, at least a portion of the tool body, particularly that portion of the tool body supporting and or defining the tool face, and the tool face, may be comprised of materials having low CTE. Such materials may include carbon foam, HDCF, and selected other materials including tool face materials. The low CTE of these materials may be substantially similar or essentially equivalent to those of some carbon fiber composites. Such tooling, comprising carbon foam and HDCF, may be particularly useful for the fabrication of carbon fiber composites, particularly of tightly controlled dimensions.

In some embodiments, a single tool may have one or more tool faces defined at least in part by a surface of the HDCF incorporated in the tool body. In other embodiments, a single tool may have one or more tool faces defined at least in part by a surface of the carbon foam incorporated in the tool body. In still other embodiments, a single tool may have one or more tool faces defined at least in part by a surface of a tool face material which is supported by at least one of carbon foam and HDCF incorporated in the tool body.

In some embodiments, the described tool bodies comprising carbon foam and HDCF may be considered to be composite structures having at least one tool face. Similar composite structures which do not include a tool face are described in U.S. patent application Ser. No. 11/751,651, entitled "Carbon Foam and High Density Carbon Foam Composite Assembly" filed on May 22, 2007, herein incorporated by reference in its entirety.

Carbon foams useful in tools may include virtually any carbon foam. Carbon foam is typically a strong, open cell, durable, stable, easily machined, and relatively unreactive lightweight material. Carbon foams are materials of very high carbon content that have appreciable void volume. Carbon foams are carbon materials. As such, carbon foams are primarily comprised of (elemental) carbon. In appearance, excepting color, carbon foams resemble readily available commercial plastic foams. As with plastic foams, the void volume of carbon foams is located within numerous empty cells. The boundaries of these cells are defined by the carbon structure. These cells typically approximate ovoids of regular, but not necessarily uniform, size, shape, distribution, and orientation. The void volumes in these cells may directly connect to neighboring void volumes. Such an arrangement is referred to as an open-cell foam. The carbon in these foams forms a structure that is continuous in three dimensions across the material. Typically, the cells in carbon foams are of a size that is readily visible to the unaided human eye. Also, the void volume of carbon foams is such that it typically occupies much greater than one-half of the carbon foam volume. The density of carbon foams typically is less than about 1. g/cc and generally less than about 0.8 g/cc. In some embodiments, the density for carbon foam may range from about 0.05 g/cc to about 0.8 g/cc. In some embodiments, carbon foams may exhibit compressive strengths ranging up to about 10,000 psi. In other embodiments, the compressive strength for carbon foam may range from about 100 psi to about 10,000 psi. In certain other embodiments, compressive strengths for carbon foam may range from about 400 psi to about 7,000 psi. The carbon foam incorporated in a tool body may be carbonized carbon foam. Alternatively, if desired, the carbon foam incorporated in a tool body may be graphitized carbon foam.

Carbon foams may also exhibit very low coefficients of thermal expansion which may be essentially equivalent to those of carbon fiber composites. The CTE of carbon foam may be modified by control of the maximum temperature to which the carbon foam is exposed during preparation or by selection of the material, and process, used for preparing carbon foam. In some embodiments, carbon foams exhibit a coefficient of thermal expansion from about 3.5 ppm/° C. to 6.5 ppm/° C.

The regular size, shape, distribution, and orientation of the cells within carbon foam readily distinguish this material from other carbon materials such as metallurgical cokes. The void volumes within cokes are contained in cell-like areas of typically ovoid shape and random size, distribution, and orientation. That is, in cokes, some void volumes can be an order of magnitude, or more, larger than others. It is also not uncommon that the over-lapping of void volumes in cokes results in significant distortions in the void shape. These distortions and large void volumes can even lead to a product that has limited structural integrity in all except smaller product volumes. That is, it is not uncommon for coke to be friable and larger pieces of coke to readily break into smaller pieces with very minimal handling. Such breakage is typically not exhibited by carbon foams. Also, a given sample of coke can exhibit both open and closed-cell void volumes.

Carbon foams have been produced by a variety of methods. Some of these methods include producing carbon foams directly from particulate coal. For example, U.S. Pat. Nos. 6,749,652 and 6,814,765, each herein incorporated by reference in their entirety, describe methods for producing carbon foam directly from particulate coal. In addition to particulate coal feedstocks, carbon foam forming feedstocks, also referred to as carbon foam precursors, may include, but are not limited to, coal, pitch, coal extracts, mesophase pitches, mesophase materials, hydrogenated coals, hydrogenated coal extracts, solvent refined coals, solvent refined coal extracts, and the like. Additionally, carbonizable polymeric foams such as phenolic and furan foams may be carbonized to produce carbon foam. Typically, specific, different, processes are utilized for the production of carbon foams using each type of feedstock.

HDCF is typically a strong, dense, hard, porous, durable, stable, and relatively unreactive carbon material. In some embodiments, the density of HDCF may be greater than about 1. g/cc. HDCF may exhibit differing sets of properties dependant on the feedstock(s) used for production, the selected production process, and any post-production treatments. In various embodiments, HDCF may exhibit differing degrees or magnitudes of, for example, electrical conductivity, surface hardness, CTE, density, porosity, graphitization, crush strength, and the like. In some embodiments, HDCF may exhibit very low coefficients of thermal expansion which may be essentially equivalent to those of carbon fiber composites. The CTE of HDCF may be modified by control of the maximum temperature to which the HDCF is exposed during preparation or by selection of the feedstock, and process conditions, used for preparing HDCF.

HDCF are those carbon foams that exhibit densities of about 1. g/cc or greater. In certain embodiments, the densities may range from about 1. g/cc to about 2. g/cc. In other embodiments, the densities may range from about 1.2 g/cc to about 1.8 g/cc. In still other embodiments, the densities may range from about 1.3 g/cc to about 1.6 g/cc. HDCF, when heated to temperatures greater than about 700° C., and more typically greater than about 950° C., followed by cooling to essentially ambient temperatures, may have compressive strengths (ASTM C365) greater than about 5,000 lbs/in$^2$, in some embodiments greater than about 10,000 lbs/in$^2$, and in other embodiments greater than about 20,000 lbs/in$^2$. Some HDCF may be electrically conductive and exhibit electrical resistivities less than about 0.002 ohm-cm. HDCF may also exhibit good thermal transport properties. In some embodiments, the HDCF may have a thermal conductivity between about 5 to 70 W/mK. In other embodiments, the HDCF exhibits an appreciable (surface) hardness. The body of these HDCF may be largely isotropic. HDCF are materials of very high carbon content that have limited void volume. HDCF are carbon materials. As such, HDCF are primarily comprised of (elemental) carbon.

To the unaided eye, HDCF may appear to be non-porous solids. However, optical microscopic examination of HDCF at 10× to 100× may show some degree of porosity. In some embodiments, this porosity is evenly distributed in the foam. The porosity of the HDCF provides void volumes within the foam that are predominately in communication with one another and with the exterior of the foam, thus providing a structure that may be referred to as "open celled" or "porous".

In some embodiments, optical microscopic examination of HDCF at a magnification of about 90× shows that the HDCF is not simply comprised of sintered powders. That is, the vast majority of the coal particulates from which the foam was prepared are predominantly no longer recognizable as individual particles bonded together only at their areas of mutual contact, as would be the case in a sintered material. In appearance, the microscopic structure of the HDCF may appear similar, but not equivalent, to the structures of both low density coal based carbon foams and reticulated vitreous carbons. That is, the HDCF may be comprised of defined, regular, void spaces delimited by thick, somewhat curved, interconnected carbon ligaments, which result in a continuous, open-celled, foam-like dense carbon body. Typically, the void spaces of the HDCF do not have a high population of the wide curving walls usually present in the well-defined spherical voids of lower density (densities less than 1. g/cc, and more typically less than 0.5 g/cc) coal based carbon foam. The void spaces of the HDCF materials are typically significantly smaller than those observed in a typical (low-density) carbon foam material.

In other embodiments, the structure of the HDCF may appear, under microscopic examination at about 90×, to be comprised of numerous randomly interconnected and intertwined small carbon ligaments of random size and orientation. Such interconnected ligaments are continuous through the HDCF. The surfaces of these ligaments may be curved and relatively smooth, non-uniform, irregular, or even occasionally embedded with what may be the remains of coal particles that did not achieve a high degree of plastic character. In such embodiments, void spaces defined by the ligaments may be of random size and shape with limited, if any, spherical characteristics. In some embodiments, the size and number of void spaces may be inversely related to the density of the HDCF. That is, higher density HDCF may exhibit fewer, and smaller, void volumes than do lower density HDCF. Additionally, higher density HDCF may exhibit thicker ligaments than do lower density HDCF. While the pores sizes may vary within a single piece of HDCF, the majority of the pores have a relatively consistent pore size.

HDCF and methods for production of such foams, with emphasis on the direct production from coal, are taught in U.S. patent application Ser. No. 11/393,308 filed Mar. 30, 2006, which is specifically herein incorporated by reference in its entirety. The teachings of this patent application are expanded upon in U.S. patent application Ser. No. 11/619,223, filed Jan. 3, 2007 which also is specifically herein incorporated by reference in its entirety.

HDCF useful in the present invention may include any HDCF. Such high density carbon foams may be prepared from coals. In some embodiments, for example, very hard, dense, nongraphitizable HDCF, which may be prepared from lower rank agglomerating bituminous coals, may be incorporated into a tool body. In other embodiments, for example, hard, dense, graphitizable HDCF, which may be prepared from higher rank agglomerating bituminous coals, may be incorporated into a tool body. Potentially, HDCF may also be prepared from pitches, polymeric materials, mesophase materials, coal extracts, solvent refined coals, hydrogenated coals and coal products, coal derivatives, and the like.

In some embodiments, prior to incorporation into a tool body, the HDCF may be exposed to elevated temperatures, under an inert atmosphere, sometimes as great as about 3000° C. or more. In some embodiments, the HDCF may be partially, or fully, graphitized. In other embodiments, the HDCF may be ungraphitized. In still other embodiments, the HDCF may be nongraphitzable. Depending on the planned method of use of the tool, some HDCF may be more suitable for incorporation into a given tool body than other HDCF. For example, in some embodiments, lower density, more porous, HDCF may be used to support tool face materials. In other embodiments, a surface of hard, dense, HDCF may serve as a tool face.

The tools of the present invention may be reusable, repairable, and more readily modifiable than the tools of the prior art. That is, as reusable, the tools of the present invention may be used to sequentially produce more than one composite part. The carbon foam and HDCF, comprising at least a portion of the tool body of the tools of the present invention, is bondable using conventional adhesives, resins, cements, and the like, and may be machined to close tolerances using readily available hand and/or machine tools. Such machining may be by the use of cutting tools, particularly carbide or diamond cutting tools. Such machining may also be by the use of abrasive cutting or grinding tools. As a result of these characteristics, the tools are repairable as damaged sections of carbon foam and/or HDCF used in a composite forming tool may be readily replaced by undamaged carbon foam and/or HDCF. Also, these characteristics of carbon foam and HDCF provide for the ability to readily replace sections of carbon foam and HDCF used in a composite forming tool so that sections of a tool face may be modified, as desired, without replacement of the entire tool face. The tooling of the present invention can be used with, or combined with, other known types of tooling.

In certain embodiments, the carbon foam may comprise a portion of the tool body volume with the HDCF comprising another portion of the tool body volume. In some such embodiments, the HDCF may be supported by the carbon foam such that at least one surface of the HDCF provides at least a portion of the tool body outer surface. Such an at least one surface of the HDCF may be shaped to provide at least a portion of a tool face, or, support other materials having a surface that define at least a portion of the tool face. Such tool bodies may provide for a composite forming tools, having HDCF tool faces, that exhibit weights (i.e. masses) much less than similarly sized tools comprised principally of graphite. Such tools may exhibit heat capacities significantly less than a similar sized graphite tools. Therefore such tools may be easier to heat to effect curing of the composite parts formed thereon. Additionally, such tools may have tool faces exhibiting CTE essentially equivalent to HDCF and some CFC. In some embodiments, such tools may have tool faces exhibiting CTE essentially equivalent to HDCF and some CFC, and different from that of graphite. In those embodiments, such tools may be useful for the forming of CFC having a CTE not essentially equivalent to the CTE of graphite, and may therefore be difficult to form on a graphite tool.

In those embodiments where a surface of the HDCF comprising the tool body may define a tool face, the use of a hard, dense HDCF may provide for a tool face that resists damage from impacts and use. In embodiments where the HDCF comprising the tool body supports carbon foam or a tool face material, a less dense HDCF may be preferred to provide a more porous surface for bonding with adhesive, resins, cements, and the like, and/or to reduce tool weight.

In certain embodiments, the HDCF comprising the tool body may support carbon foam or other materials having a surface that defines a tool face. In some such embodiments, the carbon foam may be supported by the HDCF such that at least one surface of the carbon foam provides at least a portion of the tool body outer surface. Such an at least one surface of the carbon foam may be shaped to provide at least a portion of a tool face, or, support other materials having a surface that define at least a portion of the tool face. In such embodiments, the HDCF may provide for a tool body having significant strength and/or rigidity. The HDCF may also provide for a tool face having significant rigidity.

In another embodiment of the present invention, other material, which may be referred to as tool face material, may be formed, deposited, coated, layered, fixed, or otherwise placed on a surface of the carbon foam or HDCF of the tool body, to provide at least a portion of a tool face. Relatively thick or relatively thin layers of tool face material(s) may be used, depending on the properties of the tool face material and the intended uses of the surface to which the tool face material is applied. The tool face material may cover the entire tool face. Tool face material may also cover surfaces of the tool body that are not tool faces. Tool face material covered non-tool face surfaces may contact the resin or other materials used for forming the composite part. The carbon foam or HDCF may be machined or otherwise contoured or formed to produce a surface having a specific shape prior to the forming and/or depositing of the tool face material. Forming or depositing the tool face material on such a shape may then produce a tool face having the desired configuration and dimensions. Alternatively, after forming and/or deposition of the tool face material on the carbon foam or HDCF surface, this material may then be machined or otherwise formed or contoured to provide a tool face of the desired geometry. Machining of the HDCF, carbon foam, or tool face material may be more precisely controlled to the desired dimensions by incorporating witness marks, index pins, or the like, into or on the tool body prior to the initiation of any precision machining operation.

The use of a tool face material may provide for a very smooth tool face of high dimensional accuracy. The use of tool face materials may also provide for easier removal of the formed composite part. Typically, parting films or release agents may be used with the tool faces provided by tool face materials. Additionally, the CTE of a tool face material may be matched with the CTE of the resultant composite part and/or with the portion of the tool body supporting the tool face material. Such matching may insure the dimensional and structural accuracy and precision of the formed composite part. Additionally, such matching may provide for post curing of parts on or in the tool, as opposed to free standing curing. In certain embodiments, the CTE of the tool body, tool face, tool face materials, and composite part are substantially similar or essentially equivalent.

The term "substantially similar" CTEs as used herein, may refer to CTE values that are sufficiently close in magnitude that the produced composite part has the desired critical dimensions and is not trapped or retained in, or sprung from, the tool by the effect of non-equivalent expansions and contractions of the composite part and tool face, or, are those having values that are sufficiently close in magnitude that the tool face is not damaged by the effect of non-equivalent expansions and contractions of the composite part and tool face. If the CTE of the tool face material(s) does not match the CTE of the underlying HDCF and/or carbon foam, the tool face may exhibit a CTE between those of the two materials. It is anticipated that such an occurrence may provide a method achieving a tool face CTE that is not readily obtained by other methods. It is also anticipated that tool faces composed of thin layers of tool face materials may exhibit the CTE of the underlying carbon foam or HDCF. This would especially be expected to occur with very thin layers of tool face materials having some elastic properties.

A number of different materials may be used, alone or in combination, as the tool face material. These materials include, for example, cured resins, including phenolic, polyimide, BMI, and epoxy resins, prepegs, adhesive films, coatings, and the like, either alone or in combination. The tool face material may also be, for example, a composite, including those of fiberglass, carbon fiber, carbon-carbon, and other similar materials including other fiber and particulate composites. Additionally, the tool face material may be INVAR®, silicon carbide, zirconia ceramics, carbon, and other metals and ceramics. Such types of additional tool face materials may be deposited on the carbon foam and/or HDCF to form a tool face using techniques including, but not limited to, arc and flame spraying and vapor deposition. Suitable tool face materials may be essentially gas impermeable. Metals, ceramics, and carbon composites having low CTEs may be particularly useful tool face materials, especially for those tools used to produce CFC.

In some embodiments, for some HDCF tool faces, the use of a release compound may be necessary to prevent bonding of the composite forming materials to the HDCF. In other embodiments, the use of a parting film may be required to prevent bonding of the composite forming materials to the carbon foam or HDCF having a surface defining the tool face. Even with the use of a parting film, the porosity in some HDCF or the cell size of the carbon foam may be reflected in the possible surface patterning of the resultant composite part. This impact of this patterning may be reduced or eliminated by the use of essentially non-porous, dense, HDCF or carbon foams having smaller cell sizes. Carbon foams of different cell sizes, or HDCF of different porosities, may be utilized in a single tool body. For example, a small cell foam, or a low porosity HDCF, may be used to define the tool face while a lighter, large cell foam, or a higher porosity HDCF, may be used to support the denser carbon foam, or lower porosity HDCF, defining the tool face. Alternatively, a tool face may incorporate surfaces of both small cell and large cell carbon foam and/or high and low porosity HDCF. The surface pattering of the resultant composite part will then reflect the use of carbon foams of different cell sizes and/or the HDCF of different porosities.

Such surface pattering may also be minimized or eliminated by loading, that is filling, the porosity of the HDCF and/or filling the cells, that is, the internal void volume, of the carbon foam, with a filling material. Filling materials may include, but are not limited to cured resins, pitches, cured moldable ceramics, and the like. Some filling materials, including but not limited to some cured resins and pitches, tars, and the like, may also be carbonized to produce a carbon filling material. The porosity of the HDCF and/or carbon foam may be partially or completely filled with the filling material. For example, only the volume of the carbon foam or HDCF that is closest to the tool face may be filled with the filling material. Alternatively, a fraction of, or the entire, internal void volume of the carbon foam or porosity of the HDCF may be filled. For carbon foam, such filling may be complete such that each cell is completely loaded with filling material or may be incomplete such that each cell is only partially filled with the filling material. Similarly, the porosity of a given volume of HDCF may be essentially totally or partially filled. Partial filling of the carbon foam cells or HDCF porosity will minimize pattering. In some embodiments, a smooth tool face will be provided by the complete filling of the carbon foam cells and/or porosity of the HDCF, minimally at the tool face surface. Additionally, a smoother surface may provide for the use of a release agent, in place of a parting film, to prevent the bonding of the composite forming materials to the tool face. Complete filling of the carbon foam cells or HDCF porosity in some volume of carbon foam or HDCF surrounding the tool face, possibly including filling of the carbon foam cells or HDCF porosity at the tool face surface, with a gas impermeable filling material may be required for those instances where it is desired that a vacuum be produced above the tool face. Additionally, the porosity of the HDCF and/or carbon foam cells may be partially or completely filled with a filling material to increase the mechanical properties, such as strength, of the carbon foam and/or HDCF.

A vacuum may be produced within a carbon foam and HDCF tool body to aid in the placement of resin and/or resin based composite tool face materials. Additionally, any undesired surface porosity exhibited by any tool face material after placement on the tool body may be filled by coating the tool face material with a thin layer of resin. Permeation of such thin resin layers into any tool face material surface porosity may be aided by the production of a vacuum within the carbon foam and HDCF tool body.

The tool face may also be formed such that it imparts a texture to a surface of the composite part formed by the tooling. The tool face may be inscribed with a dimensionally negative pattern such that the positive image of this pattern will be imparted to a surface of the formed composite part. Such patterns may include any combination of a plurality of different textures, cross-hatching, scribe-lines, and the like for establishing an outside shape and/or imparting texture to a composite part formed thereon. Additionally, the tool face (s) surface may not be homogeneous. For example, one portion of the tool face(s) has a first texture while other portions of the tool face have different textures.

Tool body geometries may be of a mandrel like shape. For such tool bodies, the tool face would then be the outer surface of this mandrel like shape. For example, resin impregnated paper, fabric, fiber, and the like, may then be placed upon the surface of the mandrel (i.e. the tool face) by manual or automatic means to form a composite part having a surface, typically an interior surface, the dimensions of which mirror those of the outer mandrel surface.

Also, the tool faces may be in the form of a male part and/or a female part having cavities and/or projections with opposite shapes on opposing tool faces. In the present invention, at least a portion of one of the opposing tool faces is defined by the carbon foam or HDCF incorporated in the tool body, or is defined by a surface of a tool face material supported at least in part by the carbon foam or HDCF of the tool body. A void volume between such opposing tool faces may be filled with composite forming materials. After curing of these materials, the shape of the resultant composite part will duplicate that of the void volume between the male and female tool faces. It is also possible to have a single tool body having at least one surface providing a tool face or one surface of the walls of a cavity serving as a tool face(s). A cover may be incorporated in the tool body. Such a cover may be a flexible cover, where the cover may be comprised of a plastic, an elastomeric material, such as a silicon elastomer sheet or membrane, or other flexible sheet like material. The cover may be placed over the surface or cavity to form a closed volume. A vacuum may then be produced in the resultant closed volume. The force of the atmospheric pressure outside the closed volume then causes the cover to deform and contact the composite forming materials. This contact forces these materials against the surface or cavity walls. After curing of the composite forming materials, a composite part having the shape of the surface or the tool body cavity walls may be produced.

The composite forming materials that may be suitable for forming composite parts using the tools comprising carbon foam and HDCF may include those composite forming materials known in the relevant arts. Suitable matrix materials may include, but are not limited to, resins, prepregs, vinyl esters, adhesion films and coatings. Resins may comprise any family of thermoplastic or thermosetting resins, such as phenolic resins, and may be catalyzed. Other examples of suitable matrix materials may include epoxy resins. Such resins may be formed from low molecular weight diglicidyl ethers of bisphenol A. Depending on molecular weight, such resins may range from liquids to solid resins, and can be cured with amines, polyamides, anhydrides or other catalysts. Suitable solid resins may be modified, for example, with other resins and unsaturated fatty acids. Epoxy resins may be particularly suitable as they have good adhesion to fibers and because their thermal expansion can be tailored to match that of carbon foam and HDCF based tooling when combined with certain fibers. In addition, their low viscosities are effective in wetting various reinforcing materials. More specifically, the resins suitable for use in manufacturing composite parts may comprise any combination of commercially available resins, for example, but not limited to, Dow 330, Gougeon WEST, Gougeon XR02-099-29A, ProSet 125, ProSet 135, ProSet 145, and MGS. Also, commercially available resins that may be useful for tool face materials may comprise, but are not limited to, for example, PTM&W HT2C, AirTech Toolmaster 2001, JD Lincoln L-956, and Vantico RP 4005. Additionally, composite parts may be produced in the tooling of the present invention using vinyl esters. The matrix materials useful in the present invention may also encompass catalysts, hardeners, and other curing agents used to initiate polymerization or hardening of the matrix material system. For the purposes of this specification, suitable matrix materials will herein be collectively referred to as resins.

Prepregs are also suitable for use as composite forming materials for the production of composite parts using the tooling of the present invention. Prepregs is an abbreviation of preimpregnated and includes those reinforcing materials that are combined with an uncured matrix material prior to placement on the tool face. Prepregs may comprise any combination of mat, fabric, nonwoven material and roving with resin. Typically, these are usually cured to the B-stage, ready for molding. Further examples of prepreg material include, but are not limited to, mixtures, such as, JD Lincoln L-526, epoxy/carbon mixtures, such as, JD Lincoln L-956, ACG, and AirTech Toolmaster, and epoxy/glass mixtures, such as, Bryte, and the like. Also, commercially available prepreg material used for tool face materials may comprise epoxy/carbon combinations, for example, JD Lincoln L-956, ACG, and AirTech Toolmaster.

Moreover, composite parts may be produced in the tooling of the present invention using adhesion films. Adhesion films are a thin, dry film of resin, usually a thermoset, used as an interleaf in the production of laminates such as plywood. Heat and pressure applied in the laminating process may cause the film to bond both layers together. Some commercially available adhesion films include, but are not limited to, JD Lincoln L-313 Epoxy, SIA-MA-562, and SIA-PL-7771 FR.

Reinforcing materials used in the composites produced in the tooling of the present invention may include any of those know in the relevant arts. Such materials may include, but are not limited to, carbons (including graphite), Kevlar, arimide, glass and the like in forms that include, for example, fibers, including unidirectional fibers and chopped fibers, woven materials, and non-woven materials, and cloth materials. Particulate reinforcements may also be used.

Reinforcing structures can also be added to the composite forming materials while these materials are positioned on the tool face. Such reinforcing structures may, for example, strengthen the resulting composite part and/or form the basis for attaching the composite part to result in an assembly. These reinforcing structures may include forms such as bars, tubes, sheets, screens, flats, plates, and the like, of any specific geometric configuration. Materials of which such reinforcing structures are composed may include essentially any solid material, in some embodiments exhibiting appreciable strength, having a suitable compatibility with both the composite forming materials and any associated curing conditions. Such materials may include metals, ceramics, plastics, wood, glass, previously cured composites, graphite, carbon foam, HDCF, and the like. In practice, reinforcing structures may be immersed in, or placed against a surface of, the composite forming materials on the tool face. After curing of the composite forming materials, the reinforcing structures may be more firmly attached to the resulting composite part by the use of screws, clips, adhesives, and the like if so desired or required. Specifically, such reinforcing structures may have CTEs that are substantially similar or identical to that of the resultant composite part.

Various composite forming techniques may be used in conjunction with the tools of the present invention. These techniques are well know to those skilled in the associated arts and include, but are not limited to, hand lay up, automated lay up, hand spray up, automated spray up, resin transfer molding (RTM), and vacuum assisted resin transfer molding (VARTM). Additionally, any combination of such methods may also be used.

Resin transfer molding is a method by which liquid thermoset polymeric resins are transferred within a volume that may be confined, such as, for example, a cavity or a channel within or on a tool body or tool body surface. Reinforcements, such as chopped fibers, may be distributed within the resin prior to distribution. Alternatively, a fiber reinforcement may be positioned within the volume, particularly in the area of the volume defined by a tool face. RTM is typically practiced by transferring or injecting catalyzed resin, examples of which include polymers of epoxy, vinyl ester, methyl methacrylate, phenolic, and polyester into a volume of the tool a least partially defined by a tool face(s). The resins fill the volume and infuse into reinforcing materials which have been previously positioned within the volume. Care is exercised in this procedure to prevent the entrapment of gas bubbles as gas bubbles may weaken the resulting composite material. Typical reinforcements may include fiberglass and carbon fibers.

A vacuum system may also be used to assist in the transfer of the resin in and through the tool volume. This process is called vacuum assisted resin transfer molding. With adequate provision, a vacuum system may be utilized in many composite forming processes. It should be noted that for purposes of this specification, a vacuum system is a system capable of reducing the internal gaseous pressure of a closed volume, connected to the vacuum system, to pressures significantly below ambient atmospheric pressure. That is, a vacuum system will evacuate an enclosure, including a closed volume. Vacuum systems typically consist of a vacuum pump and associated connecting tubing or pipe.

Additionally, the extraction of air from the composite forming materials, during forming of the composite part, by use of a vacuum system may help insure the dimensional and structural accuracy and precision of the formed composite part. That is, such air extraction can reduce, or even eliminate, the formation of air bubbles in the resulting composite part. Such bubble elimination can result in stronger composite parts. Air extraction is usually practiced by producing at least a partial vacuum in a closed volume containing the composite forming materials. Additionally, the production of a vacuum in such a closed volume, if that volume is defined by at least one flexible wall or cover, can result in the composite material being compressed, usually by design, against the tool face by the action of the environmental atmospheric pressure on the flexible wall or cover.

More specifically, the closed volume may be formed, for example, by closing, and sealing, openings, ports and/or borders which have access to the volume. This may be accomplished with a vacuum bag, including, for example, a sheet of flexible material, a bleeder cloth and a release film placed over and/or below the lay up of composite material on the tool, and the edges of the sheet, which are sealed to create a closed volume. A vacuum system is connected to the closed volume which contains the bleeder cloth, release film, and the lay up of the composite material. The entrapped air is mechanically worked out of the lay up of composite material and is removed by the vacuum system. The composite part is then cured over time under controlled temperature and pressure conditions. Depending on the material for forming the composite part and/or the characteristics of the final product, the material for forming the composite part may be cured, at temperatures ranging from about ambient temperature to about 400° F. and vacuum pressures ranging from about 0 to about 28 in Hg. These ranges are dependent on the type of resins used. That is, any suitable temperature and/or pressure may be used.

Carbon foam and HDCF may be jointly incorporated into existing composite tools to provide the benefits of the present invention. Such incorporation may be to up grade, effect repair, or to otherwise provide for any benefit of the present invention. Such incorporation is fully embodied within the scope of the present invention.

An embodiment of the present invention relates to a tool body comprising, at least in part, carbon foam and HDCF, where a surface of the HDCF defines a tool face. The HDCF and carbon foam may be selected such that the CTE of the HDCF and carbon foam are substantially similar or essentially equivalent to that of the cured composite which will be formed by the tool. In use, the HDCF tool face is coated with a release agent. Composite forming materials, which may be carbon composite forming materials, are then placed on the tool face to provide essentially uniform coverage of the tool face. The composite forming materials may be pressed against the tool face. The composite forming materials are then cured at an elevated temperature to provide a composite, which is then removed from the tool.

Another embodiment of the present invention relates to a tool body comprising, at least in part, carbon foam and HDCF wherein a surface of the HDCF supports a tool face material. The HDCF is supported at least in part by the carbon foam. A surface of the tool face material, which in some embodiments may be a carbon fiber composite, is shaped so as to define a tool face. The HDCF, carbon foam, and tool face material may be selected such that the CTE of the HDCF, carbon foam, and tool face material are substantially similar or essentially equivalent to that of the cured composite which will be formed by the tool. In use, the tool face is coated with a release agent. Composite forming materials, which may be carbon composite forming materials, are then placed on the tool face to provide essentially uniform coverage of the tool face. The composite forming materials may be pressed against the tool face. The composite forming materials are then cured at an elevated temperature to provide a composite, which may be a carbon composite, which is then removed from the tool.

A further embodiment of the present invention relates to a tool body comprising, at least in part, carbon foam and HDCF where the carbon foam is at least partially supported by the HDCF. A surface of the carbon foam, comprising a least a portion of the tool body, supports a tool face material. A surface of the tool face material, which in this embodiment is a carbon fiber composite, is shaped so as to define a tool face. The carbon foam, HDCF, and tool face material may be selected such that the CTE of the carbon foam, HDCF, and tool face material are substantially similar or essentially equivalent to that of the cured composite which will be formed by the tool. In use, the tool face is coated with a release agent. Carbon composite forming materials are then placed on the tool face to provide essentially uniform coverage of the tool face. The composite forming materials may be pressed against the tool face. The composite forming materials are then cured at an elevated temperature to provide a carbon composite, which is then removed from the tool.

Reference will now be made in detail to other embodiments of the present invention, examples of which are illustrated in the accompanying Figures. Various aspects of these embodiments can be combined under the teachings of the present invention to provide additional examples which are not specifically laid forth. Therefore these embodiments are intended to be only illustrative of the present invention and are not to be considered limiting of that invention.

FIG. 1 illustrates a tool and a system for fabricating at least one composite part, according to an embodiment of the invention. FIG. 1 illustrates a cross-sectional representation of a reusable tool 10 having a tool face 11. The body of this tool is comprised of a piece of carbon foam 12 and a piece of HDCF 13. The carbon foam piece 12 and the HDCF piece 13 are bonded together at their area of mutual contact 14 using an adhesive, resin, or other similar bonding material. The carbon foam nearest the tool face may be partially or completely filled with a filling material.

Composite parts may be produced using such a tool face by first coating the tool face with a release compound. Alternatively, the tool face may be covered with a parting film or sheet. Composite forming materials may then be placed on the tool face or parting film covering the tool face. These composite forming materials are positioned, mechanically or manually, over the area of the tool face or parting sheet covering the tool face such that, in some embodiments, an essentially uniform distribution of these materials is obtained. The composite forming materials may be pressed against the tool face or parting sheet covering the tool face. This pressing may be performed to insure the composite forming materials conform to the configuration of the tool face. Also, if the tool face is unfilled carbon foam, such pressing may impart some type of patterning, representative of the unfilled carbon foam cells on the tool face, to the tool face defined surface of the composite part.

The composite forming materials are then cured to produce a composite, i.e. a composite part, having the form imparted by the tool face. Heating of the composite forming materials may be preferred or required for some composite forming materials to effect curing. Heating may be accomplished by use of an autoclave, oven, individual heating elements, and/or other like heating devices. Individual heating elements can be external to, or internal to (i.e. embedded within), the tool body. As was discussed previously, heating will effect changes in the dimensions of all the heated materials. The magnitudes of such dimensional changes are dependent on the CTEs of the individual materials. For this, and all the examples included in this specification, the CTE of the tool face and of the resultant composite part are preferably similar or essentially equivalent, such as may be the case if the resultant composite part is a CFC. Additionally, in some embodiments, the CTE of the tool face and carbon foam and HDCF of the tool body may be similar or essentially equivalent to that of the resultant composite part. If the CTE of the composite part is not similar or essentially identical to that minimally of the tool face, the size of the composite part may not confirm to the desired critical dimensions. Additionally, if the CTE is greater than that of the tool face, the component part may become "locked" on the tool face with separation from the tool face without damage to the tool face or composite part being difficult if not impossible.

Figure 2:
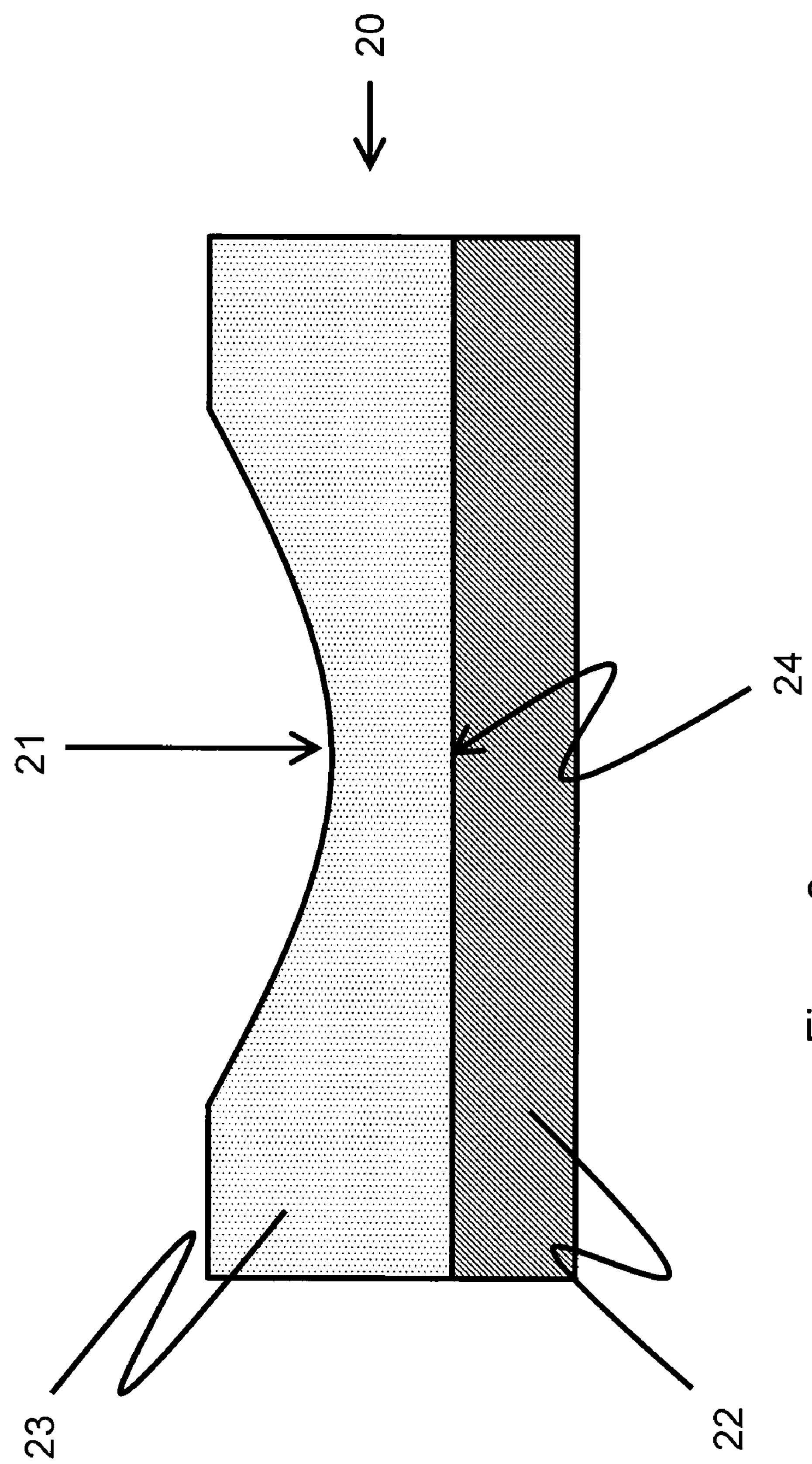
FIG. 2 illustrates a cross-sectional representation of a reusable tool having a tool body comprising carbon foam and high density carbon foam. Composite forming materials may be placed on the tool face of this tool for the purpose of forming a composite part.

FIG. 2 illustrates another embodiment of a tool and a system for fabricating at least one composite part. FIG. 2 illustrates a cross-sectional representation of a reusable tool 20 having a tool face 21. The body of this tool is comprised of a piece of carbon foam 22 and a piece of HDCF 23. The carbon foam piece 22 and the HDCF piece 23 are bonded together at their area of mutual contact 24 using an adhesive, resin, or other similar bonding material. The HDCF nearest the tool face may be partially or completely filled with a filling material.

Such a tool, having a tool face defined by a surface of HDCF, may be used for the production of composite parts in much the same manner as described above with respect to FIG. 1.

Figure 3:
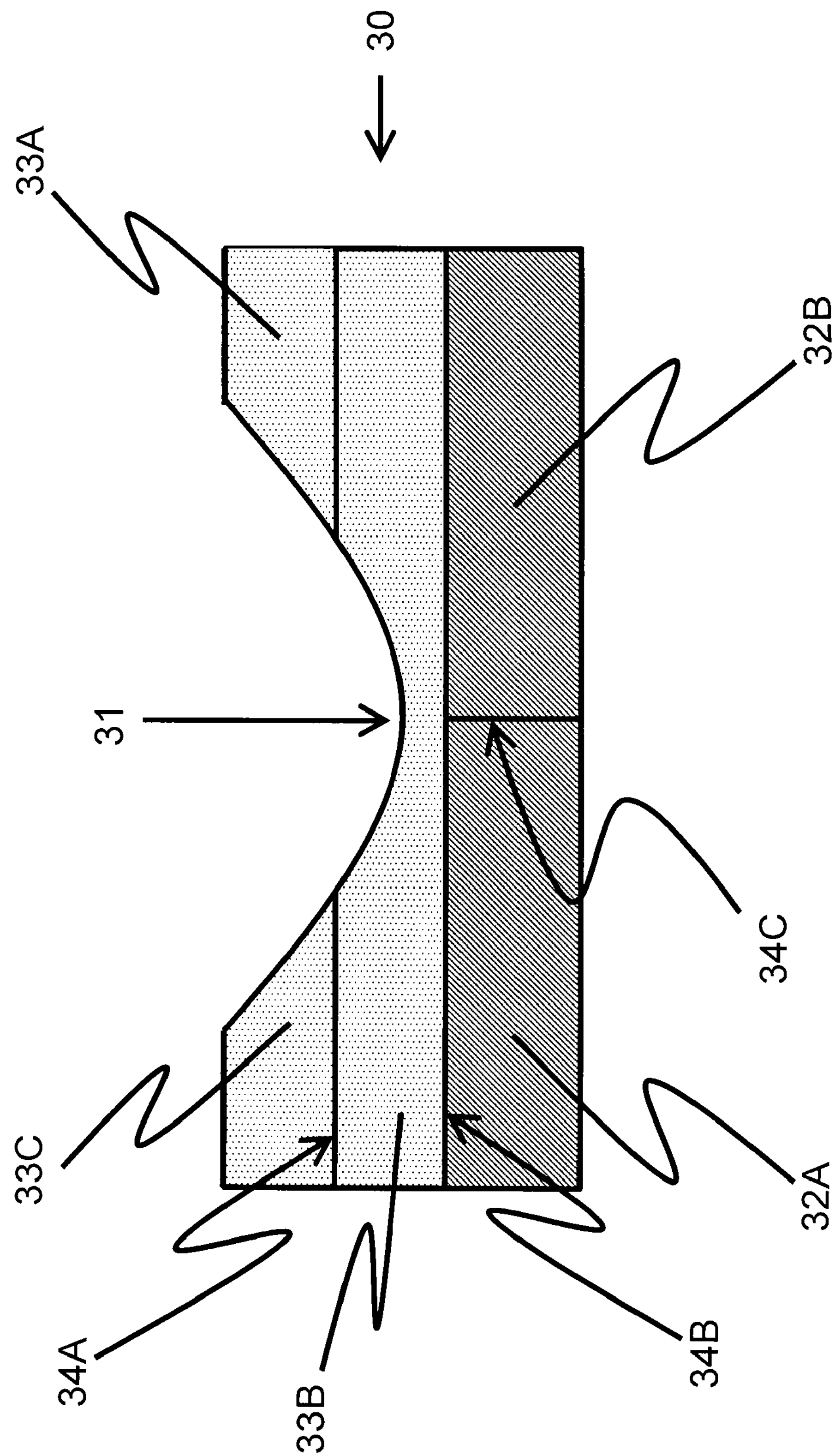
FIG. 3 illustrates a cross-sectional representation of a reusable tool having a tool body comprising carbon foam and high density carbon foam. Composite forming materials may be placed on the tool face of this tool for the purpose of forming a composite part.

FIG. 3 illustrates a further embodiment of a tool and a system for fabricating at least one composite part. FIG. 3 illustrates a cross-sectional representation of a reusable tool 30 having a tool face 31. The body of this tool is comprised of more than one piece of carbon foam 32A and 32B and more than one piece of HDCF 33A, 33B, and 33C. The carbon foam pieces 32A and 32B and the HDCF pieces 33A, 33B, and 33C are bonded together at their areas of contact 34A, 34B, and 34C using an adhesive, resin, or other similar bonding material. The HDCF nearest the tool face may be partially or completely filled with a filling material.

Such a tool, having a tool face defined by a surface of HDCF, may be used for the production of composite parts in much the same manner as described above with respect to FIG. 1.

Figure 4:
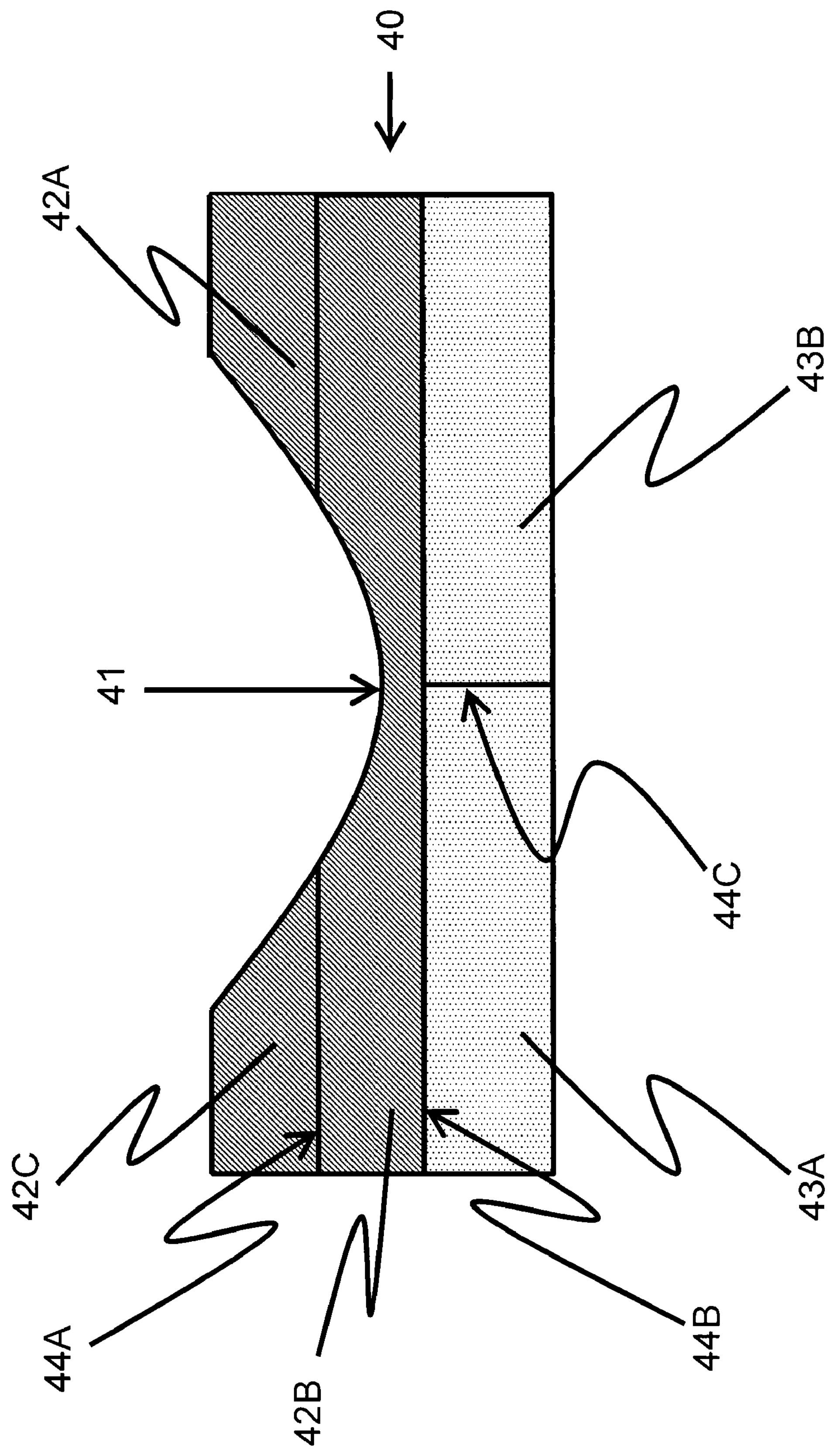
FIG. 4 illustrates a cross-sectional representation of a reusable tool having a tool body comprising carbon foam and high density carbon foam. Composite forming materials may be placed on the tool face of this tool for the purpose of forming a composite part.

FIG. 4 illustrates still another embodiment of a tool and a system for fabricating at least one composite part. FIG. 4 illustrates a cross-sectional representation of a reusable tool 40 having a tool face 41. The body of this tool is comprised of more than one piece of carbon foam 42A, 42B, and 42C and more than one piece of HDCF 43A, and 43B. The carbon foam pieces 42A, 42B, and 42C and the HDCF pieces 43A and 43B are bonded together at their areas of contact 44A, 44B, and 44C using an adhesive, resin, or other similar bonding material. The carbon foam nearest the tool face may be partially or completely filled with a filling material.

Such a tool, having a tool face defined by a surface of carbon foam, may be used for the production of composite parts in much the same manner as described above with respect to FIG. 1.

Figure 5:
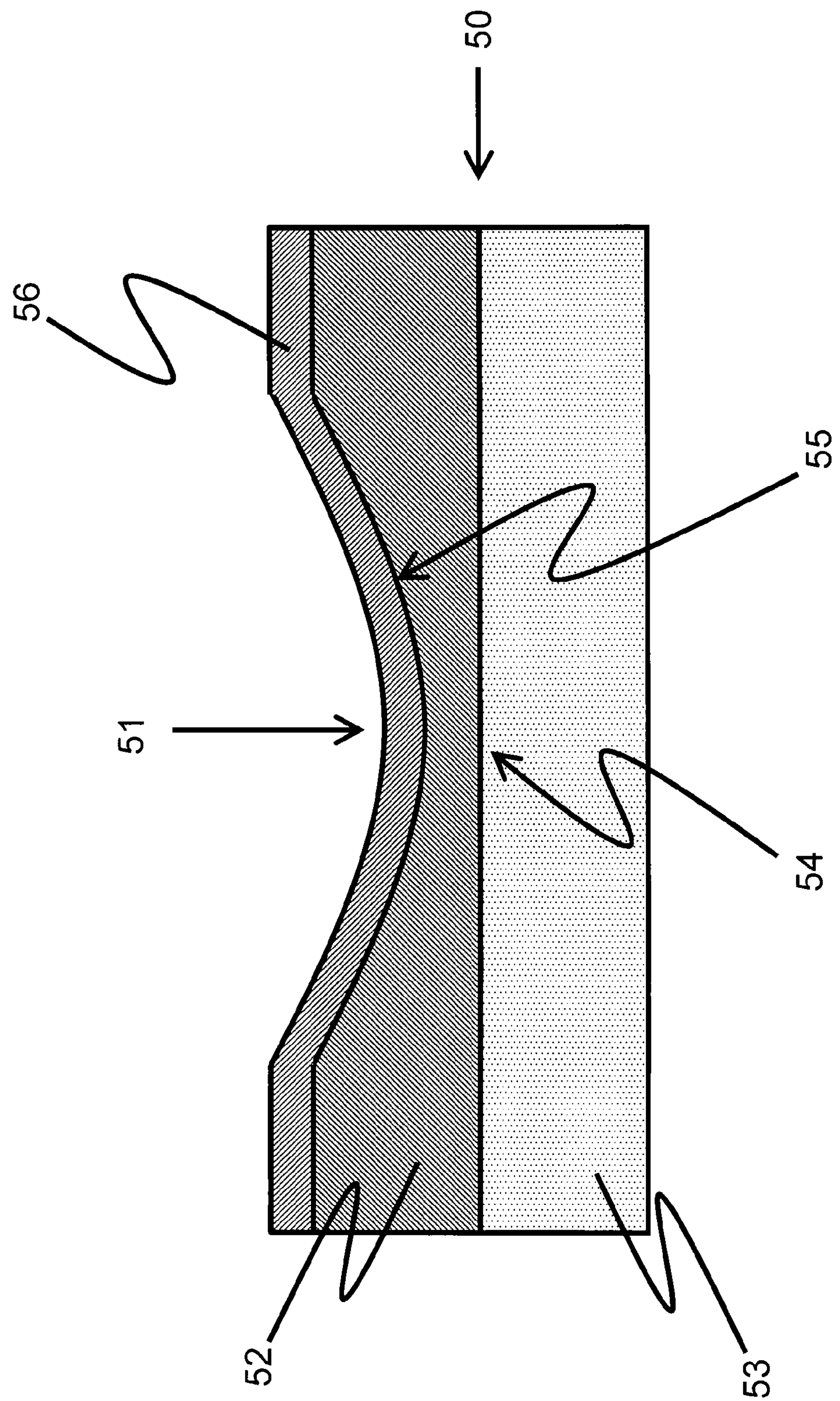
FIG. 5 illustrates a cross-sectional representation of a reusable tool having a tool body comprising carbon foam and high density carbon foam. Composite forming materials may be placed on the tool face of this tool for the purpose of forming a composite part.

FIG. 5 illustrates yet another embodiment of a tool and a system for fabricating at least one composite part. FIG. 5 illustrates a cross-sectional representation of a reusable tool 50 having a tool face 51. The body of this tool is comprised of a piece of carbon foam 52 and a piece of HDCF 53. The carbon foam piece 52 and the HDCF piece 53 are bonded together at their area of contact 54 using an adhesive, resin, or other similar bonding material. A surface of the carbon foam 55 is covered with a tool face material 56. The tool face material may be a CFC or other tool face materials as discussed above. A surface of this tool face material provides the tool face 51.

Such a tool, having a tool face defined by a surface of a tool face material, may be used for the production of composite parts in much the same manner as described above with respect to FIG. 1.

Figure 6:
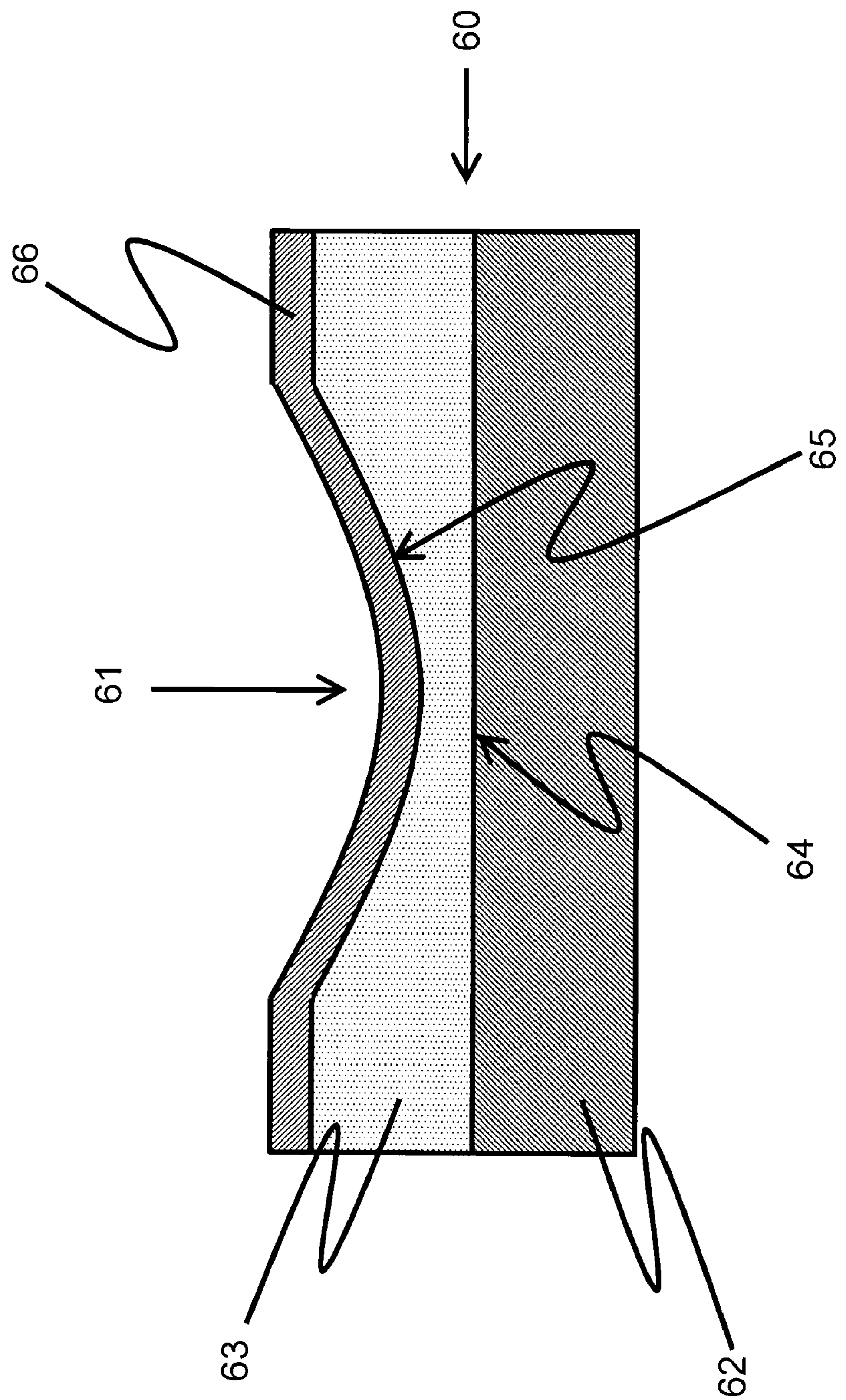
FIG. 6 illustrates a cross-sectional representation of a reusable tool having a tool body comprising carbon foam and high density carbon foam. Composite forming materials may be placed on the tool face of this tool for the purpose of forming a composite part.

FIG. 6 illustrates still another embodiment of a tool and a system for fabricating at least one composite part. FIG. 6 illustrates a cross-sectional representation of a reusable tool 60 having a tool face 61. The body of this tool is comprised of a piece of carbon foam 62 and a piece of HDCF 63. The carbon foam piece 62 and the HDCF piece 63 are bonded together at their area of contact 64 using an adhesive, resin, or other similar bonding material. A surface of the HDCF 65 is covered with a tool face material 66. The tool face material may be a CFC or other tool face material discussed above. A surface of this tool face material provides the tool face 61.

Such a tool, having a tool face defined by a surface of a tool face material, may be used for the production of composite parts in much the same manner as described above with respect to FIG. 1.

Figure 7:
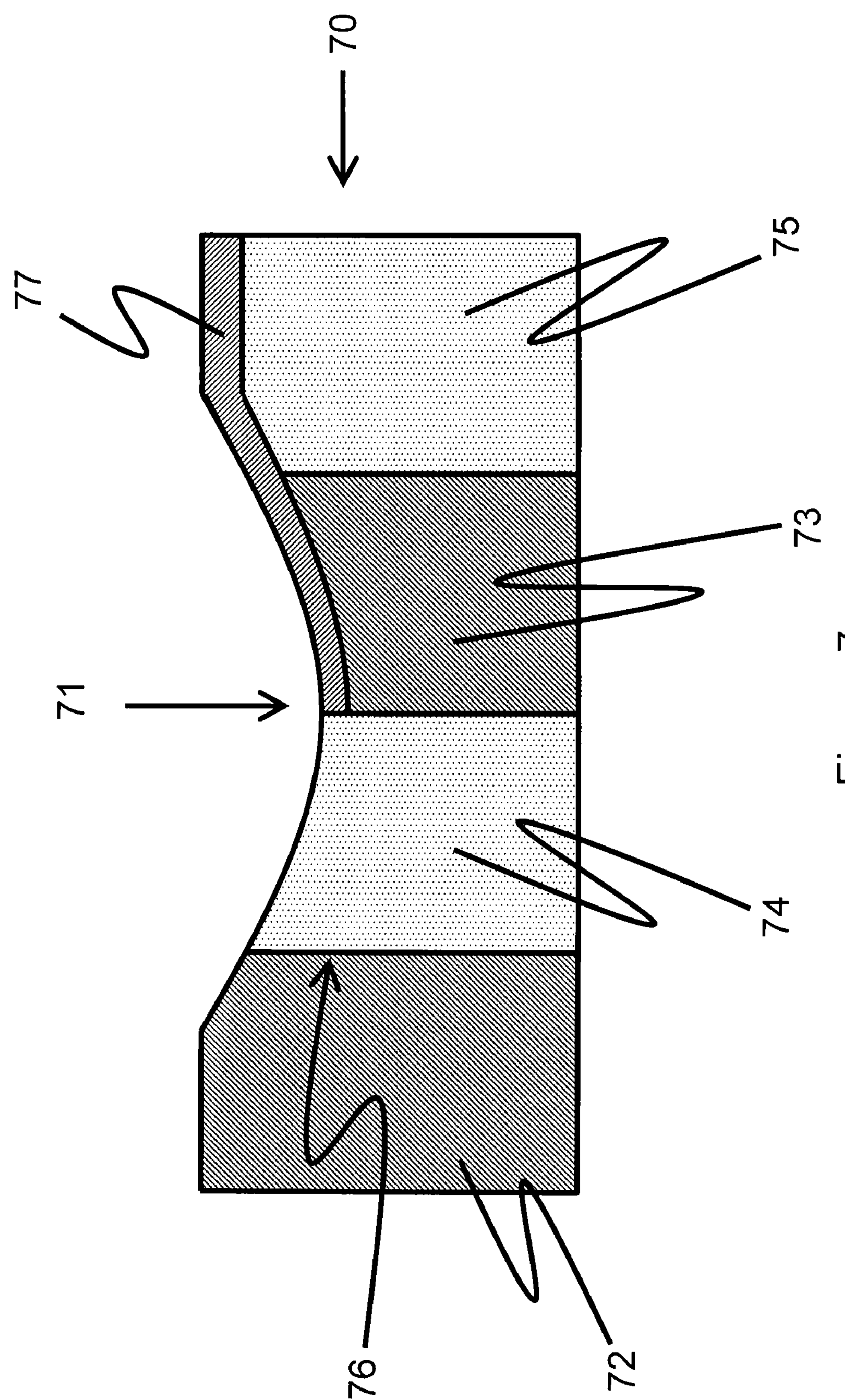
FIG. 7 illustrates a cross-sectional representation of a reusable tool having a tool body comprising carbon foam and high density carbon foam. Composite forming materials may be placed on the tool face of this tool for the purpose of forming a composite part.

FIG. 7 illustrates an additional embodiment of a tool and a system for fabricating at least one composite part. FIG. 7 illustrates a cross-sectional representation of a reusable tool 70 having a tool face 71. The body of this tool is comprised of at least two pieces of carbon foam 72 and 73 and at least two pieces of HDCF 74 and 75. The carbon foam pieces 72 and 73 and the HDCF pieces 74 and 75 are bonded together at their areas of contact 76, for example, using an adhesive, resin, or other similar bonding material. A surface of a piece of the carbon foam 73 and a surface of a piece of the HDCF 75 are covered with a tool face material 77. The tool face material may be a CFC or other tool face material as discussed above. A surface of this tool face material 77, a surface of the carbon foam piece 72, and a surface of the HDCF piece 74 provide a tool face 71.

Such a tool, having tool face comprising the surface of a tool face material, a surface of a carbon foam piece, and a surface of a HDCF piece, may be used for the production of composite parts in much the same manner as described above with respect to FIG. 1.

Figure 8:
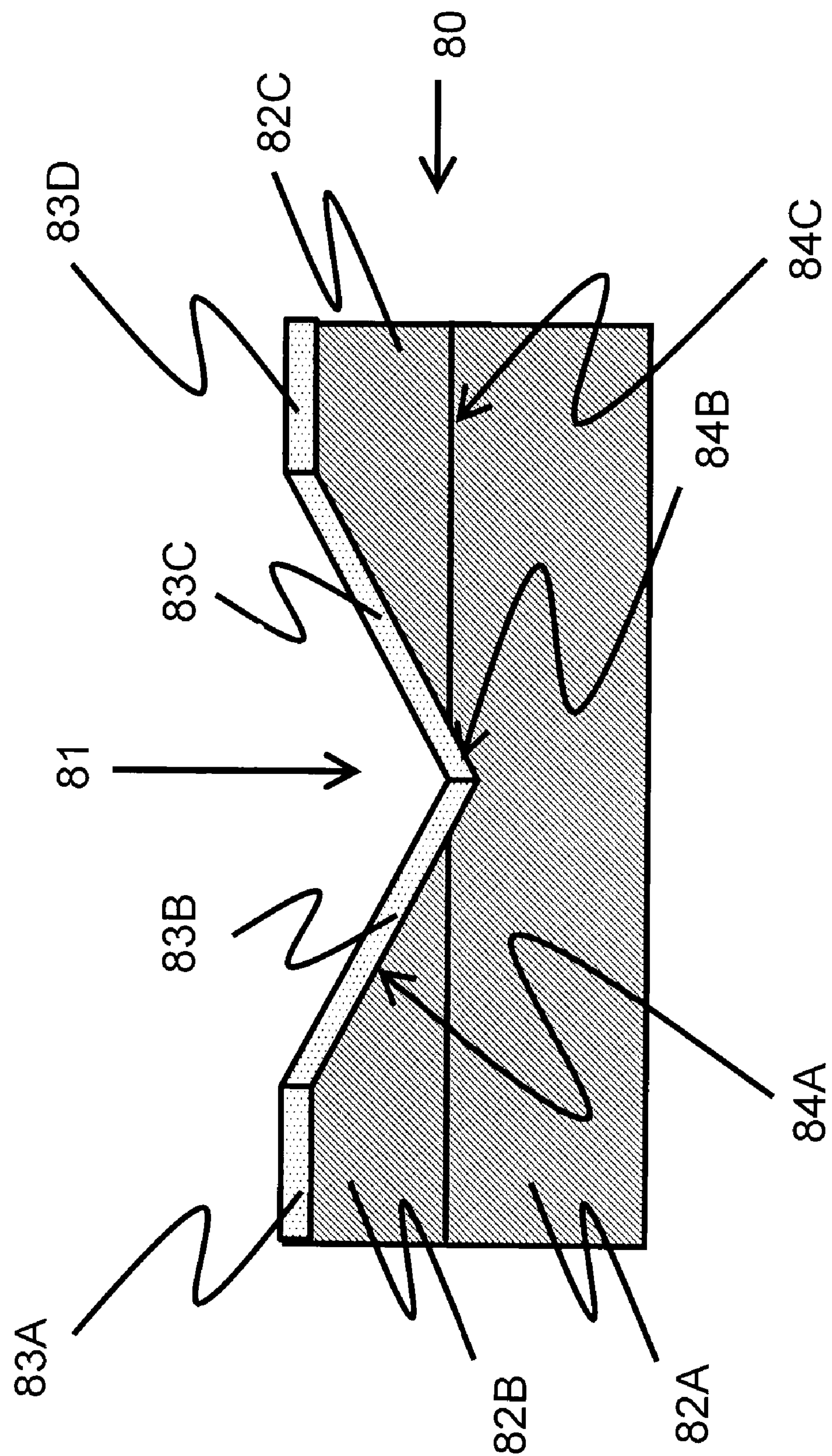
FIG. 8 illustrates a cross-sectional representation of a reusable tool having a tool body comprising carbon foam and high density carbon foam. Composite forming materials may be placed on the tool face of this tool for the purpose of forming a composite part.

FIG. 8 illustrates another embodiment of a tool and a system for fabricating at least one composite part. FIG. 8 illustrates a cross-sectional representation of a reusable tool 80 having a tool face 81. The body of this tool is comprised of three pieces of carbon foam 82A, 82B, and 82C and four relatively thin pieces of HDCF 83A, 83B, 83C, and 83D. The carbon foam pieces 82A, 82B, and 83C and the HDCF pieces 83A, 83B, 83C, and 83D are bonded together at their areas of mutual contact 84A, 84B, and 84C, for example, using an adhesive, resin, or other similar bonding material. The HDCF nearest the tool face may be partially or completely filled with a filling material. Such a tool, having a tool face defined by a surface of the HDCF, may be used for the production of composite parts in much the same manner as described above with respect to FIG. 1.

In certain embodiments, the design of the tool is such that the tool body volume is primarily carbon foam while the tool face is defined by relatively thin pieces of HDCF incorporated into the tool body. This type of tool body design may provide for a very rigid tool body and a HDCF tool face (which may be dense and hard) while not encountering the negative aspects (such as weight and cost) associated with a tool body comprised essentially entirely of HDCF.

Figure 9:
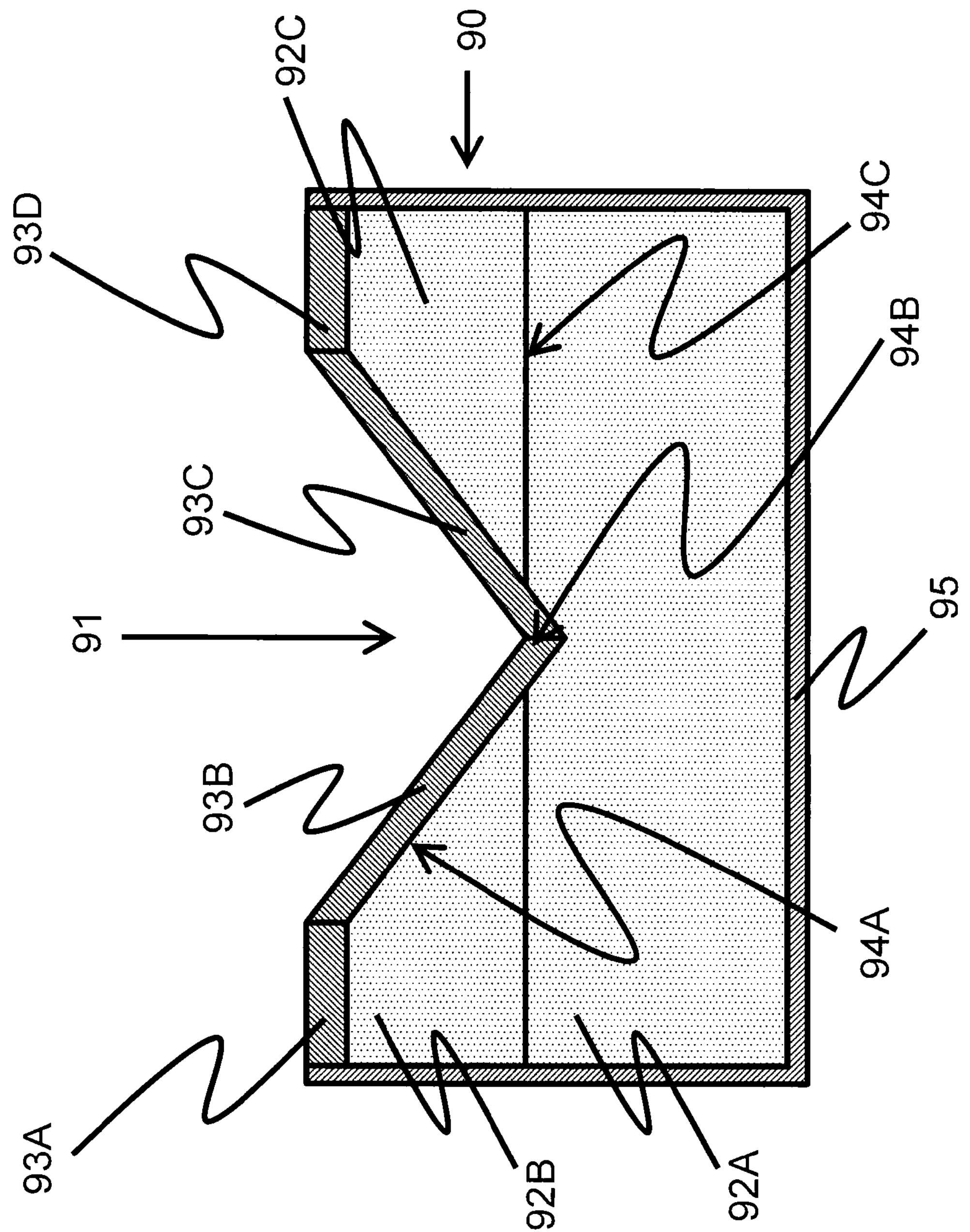
FIG. 9 illustrates a cross-sectional representation of a reusable tool having a tool body comprising carbon foam and high density carbon foam. Composite forming materials may be placed on the tool face of this tool for the purpose of forming a composite part.

FIG. 9 illustrates yet another embodiment of a tool and a system for fabricating at least one composite part. FIG. 9 illustrates a cross-sectional representation of a reusable tool 90 having a tool face 91. The body of this tool is comprised of three pieces of carbon foam 92A, 92B, and 92C and four relatively thin pieces of HDCF 93A, 93B, 93C, and 93D. The carbon foam pieces 92A, 92B, and 92C and the HDCF pieces 93A, 93B, 93C, and 93D are bonded together at their area of mutual contact 94A, 94B, and 94C, for example, using an adhesive, resin, or other similar bonding material. The HDCF nearest the tool face may be partially or completely filled with a filling material. The outer surfaces, not including the tool face, of the tool body may be covered with a covering material 95. The covering material may include, but is not limited to, composites, polymeric materials, materials used as tool face materials, metals, ceramics, and structural materials. Such covering materials may be, for example, bonded to the tool body, mechanically attached to the tool body, or held in the desired position relative to the tool body by mechanical means. In some embodiments, such covering materials may comprise polymeric materials that are infused into non-tool face surface(s) of the tool body. Covering materials may serve to provide some degree of mechanical protection to the non-tool face surface(s) of the tool body. In other embodiments, covering materials may serve to seal, or otherwise make impermeable, non-tool face surface(s) of the tool body. Such a tool, having a tool face defined by a surface of HDCF, may be used for the production of composite parts in much the same manner as described above with respect to FIG. 1.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A tool for the production of at least one composite part, the tool comprising a tool body having a tool face wherein the tool body is comprised of at least one piece of carbon foam and at least one piece of high density carbon foam having a thermal conductivity between about 5 to 70 W/mK, and wherein the tool face defines a surface that is a three dimensional negative mirror image of a surface of the at least one composite part, wherein the carbon foam has a density ranging from about 0.05 g/cc to about 0.8 g/cc and the high density carbon foam has a density ranging from above about 1. g/cc to about 1.6 g/cc.

2. The tool of claim 1 wherein a surface of said tool body defines a tool face, and wherein a portion of said tool face is at least partially a surface of said carbon foam comprising said tool body.

3. The tool of claim 1, wherein a surface of said tool body defines a tool face, and wherein a portion of said tool face is at least partially a surface of said high density carbon foam comprising said tool body.

4. The tool of claim 1, wherein at least a portion of cells of said carbon foam are at least partially filled with a filling material.

5. The tool of claim 1, wherein at least a portion of the porosity of said high density carbon foam is at least partially filled with a filling material.

6. The tool of claim 4, wherein said filling material is at least one of a cured resin, a pitch, a cured ceramic, a carbonized resin, or a carbonized pitch.

7. The tool of claim 5, wherein said filling material is at least one of a cured resin, a pitch, a cured ceramic, a carbonized resin, or a carbonized pitch.

8. The tool of claim 1, wherein the coefficient of thermal expansion of said tool face is substantially similar to the coefficient of thermal expansion of the composite part.

9. The tool of claim 1, wherein at least a portion of said carbon foam comprising said tool body at least partially supports a tool face material.

10. The tool of claim 1, wherein at least a portion of said high density carbon foam comprising said tool body at least partially supports a tool face material.

11. The tool of claim 9, wherein at least a portion of a surface of said tool face material comprises at least a portion of a tool face.

12. The tool of claim 10, wherein at least a portion of a surface of said tool face material comprises at least a portion of a tool face.

13. The tool of claim 9, wherein said tool face material is selected from the group consisting of metals and ceramics.

14. The tool of claim 10, wherein said tool face material is selected from the group consisting of metals and ceramics.

15. The tool of claim 9, wherein said tool face material is selected from the group consisting of metal, silicon carbide, and zirconia ceramics.

16. The tool of claim 10, wherein said tool face material is selected from the group consisting of metal, silicon carbide, and zirconia ceramics.

17. The tool of claim 9, wherein said tool face material is selected from the group consisting of a cured resin, a fiber composite, and a particulate composite.

18. The tool of claim 10, wherein said tool face material is selected from the group consisting of a cured resin, a fiber composite, and a particulate composite.

19. The tool of claim 9, wherein said tool face material comprises a carbon fiber composite.

20. The tool of claim 10, wherein said tool face material comprises a carbon fiber composite.

21. The tool of claim 1, the high density carbon foam has a density ranging from about 1.3 g/cc to about 1.6 g/cc.

22. A method for producing at least one composite part, comprising the steps of:

providing a tool body having a tool face, wherein said tool body is comprised of carbon foam and high density carbon foam adhered together, and wherein the tool face defines a surface that is a three dimensional negative mirror image of a surface of the at least one composite part, wherein the carbon foam has a density ranging from about 0.05 g/cc to about 0.8 g/cc and the high density carbon foam has a density ranging from above about 1. g/cc to about 1.6 g/cc, and wherein the high density carbon foam has a thermal conductivity between about 5 to 70 W/mK;

placing composite forming material on said tool face; and curing said composite forming material thereby producing the composite part.

23. The method of claim 22, wherein at least a portion of said tool face is a surface of said carbon foam comprising said tool body.

24. The method of claim 22, wherein at least a portion of said tool face is a surface of said high density carbon foam comprising said tool body.

25. The method of claim 22, wherein said composite forming material is a mixture of a resin and at least one selected from the group consisting of a particulate reinforcing material and a fibrous reinforcing material.

26. The method of claim 22, wherein the composite part is a carbon fiber composite part.

27. The method of claim 22, further comprising the step of placing a parting film between said composite forming materials and said tool face prior to placing composite forming material on said tool face.

28. The method of claim 22, further comprising the step of coating at least a portion of said tool face with a release agent prior to placing composite forming material on said tool face.

29. The method of claim 22, wherein at least a portion of cells of said carbon foam forming the at least a portion of said tool body are at least partially filled with a filling material.

30. The method of claim 22, wherein at least a portion of the porosity of said high density carbon foam forming the at least a portion of said tool body are at least partially filled with a filling material.

31. The method of claim 22, wherein at least a portion of said tool face comprises a surface of a tool face material, wherein at least a portion of said tool face material is supported by said carbon foam.

32. The method of claim 22, wherein at least a portion of said tool face comprises a surface of a tool face material, wherein at least a portion of said tool face material is supported by said high density carbon foam.

33. The method of claim 31, wherein said tool face material is selected from the group consisting of metals and ceramics.

34. The method of claim 31, wherein said tool face material is selected from the group consisting of metal, silicon carbide, and zirconia ceramics.

35. The method of claim 31, wherein said tool face material is selected from the group consisting of a cured resin, a fiber composite, and a particular composite.

36. The method of claim 31, wherein said tool face material comprises a carbon fiber composite.

37. The method of claim 32, wherein said tool face material is selected from the group consisting of metals and ceramics.

38. The method of claim 32, wherein said tool face material is selected from the group consisting of metal, silicon carbide, and zirconia ceramics.

39. The method of claim 32, wherein said tool face material is selected from the group consisting of a cured resin, a fiber composite, and a particular composite.

40. The method of claim 32, wherein said tool face material comprises a carbon fiber composite.

* * * * *